(12) United States Patent
Hong

(10) Patent No.: US 10,823,959 B2
(45) Date of Patent: Nov. 3, 2020

(54) METHOD FOR SHARING AUGMENTED REALITY APPARATUS

(71) Applicant: BOE Technology Group Co., Ltd., Beijing (CN)

(72) Inventor: Tao Hong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/412,488

(22) Filed: May 15, 2019

(65) Prior Publication Data

US 2019/0310473 A1 Oct. 10, 2019

Related U.S. Application Data

(63) Continuation of application No. PCT/CN2018/114197, filed on Nov. 6, 2018.

(30) Foreign Application Priority Data

Mar. 29, 2018 (CN) .......................... 2018 1 0271060

(51) Int. Cl.
*G02B 27/00* (2006.01)
*G06F 21/31* (2013.01)
*G06F 21/83* (2013.01)
*G06F 21/84* (2013.01)
*G06T 19/00* (2011.01)
*H04W 12/06* (2009.01)

(52) U.S. Cl.
CPC ......... *G02B 27/0093* (2013.01); *G06F 21/31* (2013.01); *G06F 21/83* (2013.01); *G06F 21/84* (2013.01); *G06T 19/006* (2013.01); *H04W 12/06* (2013.01); *G06T 2219/024* (2013.01)

(58) Field of Classification Search
None
See application file for complete search history.

(56) References Cited

U.S. PATENT DOCUMENTS

2014/0240552 A1 8/2014 Kasahara
2016/0098579 A1* 4/2016 Ballard .................. G06F 1/163
726/27
(Continued)

FOREIGN PATENT DOCUMENTS

CN 103559713 A 2/2014
CN 103907139 A 7/2014
CN 107492211 A 12/2017
(Continued)

OTHER PUBLICATIONS

Second office action of Chinese application No. 201810271060.5 dated Sep. 12, 2019.
(Continued)

*Primary Examiner* — Vu Nguyen
(74) *Attorney, Agent, or Firm* — Fay Sharpe LLP

(57) ABSTRACT

Provided is a sharing method for an augmented reality apparatus, including sending an unlocking request to a server, wherein the unlocking request comprises an augmented reality device identifier and a user identifier; receiving a sharing unlocking instruction, wherein the sharing unlocking instruction is sent by the server when the unlocking request passes a verification; and performing system unlocking on the augmented reality apparatus.

18 Claims, 7 Drawing Sheets

(56) References Cited

U.S. PATENT DOCUMENTS

2017/0012969 A1* 1/2017 Li .................. H04L 9/0866
2019/0102945 A1 4/2019 Ma et al.

FOREIGN PATENT DOCUMENTS

| CN | 107592520 A | 1/2018 |
| CN | 107797661 A | 3/2018 |
| CN | 108446400 A | 8/2018 |

OTHER PUBLICATIONS

International Search Report (including English translation) and Written Opinion of PCT/CN2018/114197, dated Feb. 3, 2019.
First Office Action of CN 201810271060.5 dated Apr. 2, 2019.

* cited by examiner

METHOD FOR SHARING AUGMENTED REALITY APPARATUS

CROSS-REFERENCE TO RELATED APPLICATIONS

This application is a continuation application of PCT Patent Application Serial No. PCT/CN2018/114197, filed on Nov. 6, 2018, which claims priority to Chinese Patent Application No. 201810271060.5, filed on Mar. 29, 2018 and entitled "AUGMENTED REALITY APPARATUS, SERVER, AUGMENTED REALITY SYSTEM AND SHARING METHOD", the entire contents of which are incorporated herein by reference.

TECHNICAL FIELD

The present disclosure relates to a server, an augmented reality apparatus, system and sharing method, and a storage medium.

BACKGROUND

Augmented reality (AR) is a technology that superimposes computer-generated virtual information on a real scene and integrates the virtual information and the real scene by means of sensing and display devices. At present, many companies have released head-mounted augmented reality apparatus, such as Google's Google projection glass, Epson's BT-300 smart glasses, Microsoft's Hololens adopting holographic waveguides, Lumus's geometric optical waveguide smart glasses, Journey Technology, Ltd.'s geometric optical waveguide glasses produced, and Beijing Ned Ltd.'s free curved-surface augmented reality glasses released.

The augmented reality apparatus may be used in many fields, such as tourism, education, medical treatment, industrial maintenance, entertainment games, home decoration, and retail. For example, in the field of tourism, by wearing augmented reality glasses, a user may acquire various useful information of a scene, where the user is located, in an unfamiliar environment, which may direct the user to reach an expected destination.

SUMMARY

Embodiments of the present disclosure provide a server, an augmented reality apparatus, system and sharing method, and a storage medium.

At least one embodiment of the present disclosure provides a sharing method for an augmented reality apparatus, comprising: sending an unlocking request to a server, wherein the unlocking request comprises an augmented reality device identifier and a user identifier; receiving a sharing unlocking instruction, wherein the sharing unlocking instruction is sent by the server when the unlocking request passes the verification; and performing system unlocking on the augmented reality apparatus.

In an implementation of the embodiments of the present disclosure, the method further comprises: acquiring real-time scene superimposition information corresponding to a real-time scene from the server after the augmented reality apparatus is subjected to system unlocking.

In an implementation of the embodiments of the present disclosure, acquiring real-time scene superimposition information corresponding to a real-time scene from the server comprises: sending a real-time scene superimposition information acquisition request to the server, wherein the real-time scene superimposition information acquisition request comprises at least one of the real-time location information, the real-time orientation information and the time information; and receiving the real-time scene superimposition information sent by the server according to the real-time scene superimposition information acquisition request.

In an implementation of the embodiments of the present disclosure, to the method further comprises: acquiring a user's instruction, modifying the real-time scene superimposition information according to the user's instruction, and sending the modified real-time scene superimposition information to the server.

In an implementation of the embodiments of the present disclosure, the method further comprises: acquiring real-time scene information after the augmented reality apparatus is subjected to system unlocking; and sending the real-time scene information acquired to the server if the server cannot provide the real-time scene superimposition information.

In an implementation of the embodiments of the present disclosure, to the method further comprises: receiving a real-time scene superimposition information update request sent by the server; acquiring information input by a user according to the real-time scene superimposition information update request, and generating real-time scene superimposition information according to the information input by the user, and t sending the real-time scene superimposition information generated In an implementation of the embodiments of the present disclosure, to the method further comprises: sending a locking request to the server, wherein the locking request comprises an augmented reality device identifier and a user identifier; receiving a locking instruction, wherein the locking instruction is sent by the server when the locking request passes the verification; and performing system locking on the augmented reality apparatus when the communication module receives the locking instruction.

In an implementation of the embodiments of the present disclosure, the real-time scene superimposition information comprises at least one of image information and voice information, the image information comprises at least one of introduction information of an object in the real-time scene of an object in the real-time scene, a map, and navigation information in the real-time scene, and the voice information comprises at least one of introduction information of an object and navigation information in the real-time scene.

At least one embodiment of the present disclosure provides an augmented reality sharing method, comprising: receiving an unlocking request, wherein the unlocking request comprises an augmented reality apparatus identifier and a user identifier; and verifying the unlocking request, and sending a sharing unlocking instruction for unlocking an augmented reality apparatus that the augmented reality apparatus identifier corresponds to if the unlocking request passes the verification.

In an implementation of the embodiments of the present disclosure, the method further comprises: receiving a real-time scene superimposition information acquisition request sent by the augmented reality apparatus, wherein the real-time scene superimposition information acquisition request comprises at least one of real-time location information, real-time orientation information, and time information of the augmented reality apparatus; and sending real-time scene superimposition information corresponding to the real-time scene superimposition information acquisition request to the augmented reality apparatus.

In an implementation of the embodiments of the present disclosure, the method further comprises: receiving real-time scene information sent by the augmented reality apparatus, send a real-time scene superimposition information update request to the augmented reality apparatus, and receiving real-time scene superimposition information sent by the augmented reality apparatus.

In an implementation of the embodiments of the present disclosure, to the method further comprises: recording the user identifier and a corresponding user reward, and increasing the user reward for the user identifier that the augmented reality apparatus corresponds to after the real-time scene superimposition information sent by the augmented reality apparatus passes the verification and is stored.

In an implementation of the embodiments of the present disclosure, the method further comprises: receiving a locking request, wherein the locking request comprises an augmented reality device identifier and a user identifier, verifying the locking request, and sending a locking instruction for locking an augmented reality apparatus that the augmented reality apparatus identifier corresponds to if the locking request passes the verification.

At least one embodiment of the present disclosure provides an augmented reality system, comprising: a server and an augmented reality apparatus, wherein the augmented reality apparatus is configured to send an unlocking request to the server, the unlocking request comprises the augmented reality apparatus identifier and a user identifier; receive a sharing unlocking instruction, wherein the sharing unlocking instruction is sent by the server when the unlocking request passes the verification; and perform system unlocking on the augmented reality apparatus; and the server is configured to receive the unlocking request; verify the unlocking request received; and send a sharing unlocking instruction for unlocking an augmented reality apparatus that the augmented reality apparatus identifier corresponds to if the unlocking request passes the verification.

In an implementation of the embodiments of the present disclosure, the augmented reality system further comprises a mobile terminal, wherein the mobile terminal is configured to send one of an unlocking request and a locking request to the server.

In another implementation of the embodiments of the present disclosure, the augmented reality system further comprises: an augmented reality apparatus protection box, wherein the server is configured to send one of a sharing unlocking instruction and a locking instruction to the augmented reality apparatus protection box.

At least one embodiment of the present disclosure provides an augmented reality apparatus, comprising: a processor; and a memory for storing instructions executable by the processor; wherein the processor is configured to execute any of the foregoing augmented reality apparatus sharing methods.

At least one embodiment of the present disclosure provides a computer-readable storage medium, wherein instructions in the computer-readable storage medium, when being executed by a processor of an augmented reality apparatus, cause the augmented reality apparatus to execute any of the foregoing augmented reality apparatus sharing methods.

At least one embodiment of the present disclosure provides a server, comprising: a processor; and a memory for storing instructions executable by the processor; wherein the processor is configured to execute the augmented reality apparatus sharing method as described above.

At least one embodiment of the present disclosure provides a computer-readable storage medium, wherein instructions in the computer-readable storage medium, when being executed by a processor of a server, cause the server to execute the augmented reality apparatus sharing method as described above.

DETAILED DESCRIPTION

The present disclosure will be described in further detail with reference to the accompanying drawings, to present the principles and advantages of the present disclosure clearer.

Due to the reasons that an augmented reality apparatus is still relatively expensive and used relatively less frequently in users' daily life at present, the usage cost of the augmented reality apparatus is relatively high.

In order to solve the above technical problem, the present disclosure provides a server, an augmented reality apparatus, system and sharing method, and a storage medium.

Figure 1:
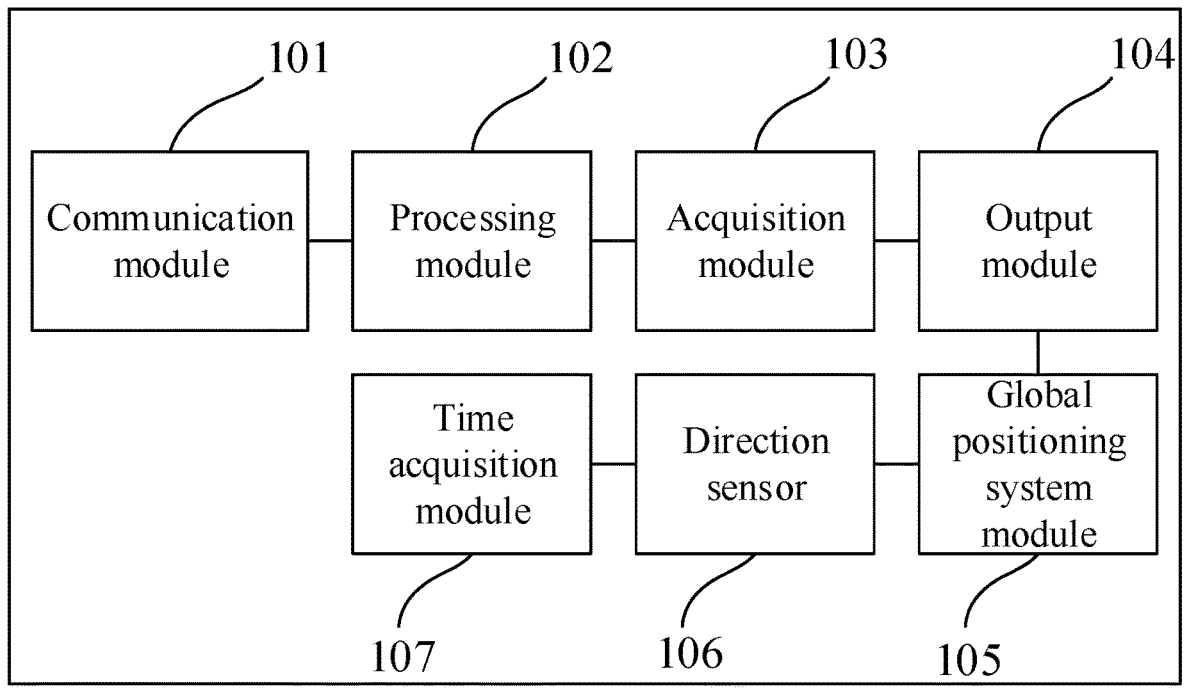
FIG. 1 is a structural diagram of an augmented reality apparatus provided in an embodiment of the present disclosure.

FIG. 1 is a structural diagram of an augmented reality apparatus provided in an embodiment of the present disclosure. With reference to FIG. 1, the augmented reality apparatus includes a communication module 101 and a processing module 102.

In the embodiment of the present disclosure, the communication module 101 is configured to send an unlocking request to a server, wherein the unlocking request comprises an augmented reality device identifier and a user identifier; and receive a sharing unlocking instruction sent by a server. The sharing unlocking instruction is sent by the server when the unlocking request passes the verification. The processing module 102 is configured to perform system unlocking on the augmented reality apparatus if the communication module 101 receives the sharing unlocking instruction. The communication module 101 is further configured to acquire real-time scene superimposition information corresponding to a real-time scene from the server after the augmented reality apparatus is subjected to system unlocking.

Here, the real-time scene refers to a real-time scene image of a location where the augmented reality apparatus is located.

In the embodiment of the present disclosure, the sharing unlocking instruction is generated by the server based on an unlocking request sent by an unbound terminal of the augmented reality apparatus. For example, sending the unlocking request is achieved by inputting the serial number of the augmented reality apparatus or scanning the two-dimensional code on the augmented reality apparatus through a mobile phone, and the server verifies the unlocking request after receiving the unlocking request and generates the sharing unlocking instruction if the unlocking request passes the verification. Verifying the unlocking request by the server refers to verifying the legality of the user that the user identifier corresponds to verifying whether the augmented reality apparatus that the augmented reality apparatus identifier corresponds to is in an idle state, etc.

The action of the sharing unlocking instruction is to unlock the augmented reality device which may be shared by different users and may be generated through triggering by different users.

In the embodiment of the present disclosure, by receiving the unlocking instruction sent by the server, the system unlocking of the augmented reality apparatus is achieved. After system unlocking, the user may use the augmented reality apparatus to integrate the virtual reality information and the real scene. In this way, different users may use the same augmented reality apparatus. Therefore, sharing the usage of the augmented reality apparatus among multiple users is achieved, and the usage cost of the augmented reality apparatus is reduced since the user does not need to purchase the augmented reality apparatus directly.

As shown in FIG. 1, the augmented reality apparatus may further include: an acquisition module 103 and an output module 104. In the embodiment of the present disclosure, the augmented reality apparatus may adopt the following two manners for outputting.

In one implementation mode of the embodiment of the present disclosure, the acquisition module 103 is configured to acquire real-time scene information after the augmented reality apparatus is subjected to system unlocking. The processing module 102 is further configured to synthesize the real-time scene superimposition information onto the real-time scene information. The output module 104 is configured to output the synthesized real-time scene information. In this implementation mode, the augmented reality apparatus synthesizes the real-time scene superimposition information and the real-time scene information and then displays it.

In the embodiment of the present disclosure, the real-time scene information may be a real-time scene picture obtained by shooting the real-time scene or combining the real-time scene picture and real-time scene audio.

In another implementation mode of the embodiment of the present disclosure, the output module 104 is configured to output the real-time scene superimposition information. In this implementation mode, when wearing the augmented reality apparatus, the user may view the real-time scene. At this time, it only needs to display the real-time scene superimposition information simultaneously so as to let the user's optic nerve implement the synthesis.

Figure 2:
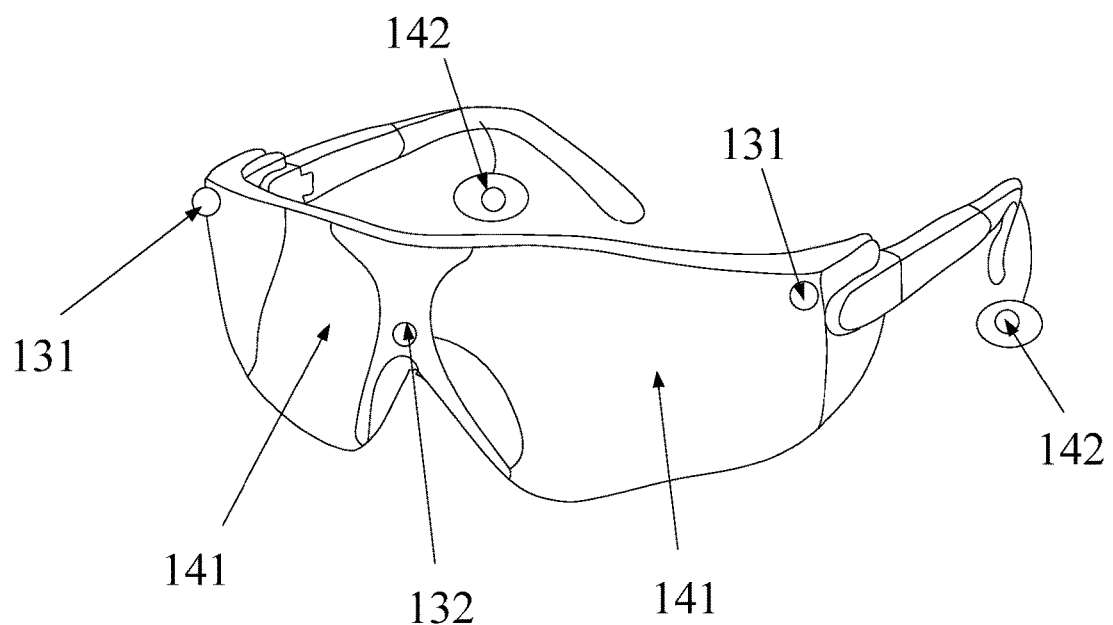
FIG. 2 is a structural diagram of an augmented reality apparatus provided in the embodiment of the present disclosure.

FIG. 2 is a structural diagram of an augmented reality apparatus provided in an embodiment of the present disclosure. With reference to FIG. 2, the augmented reality apparatus is AR glasses.

In the embodiment of the present disclosure, the acquisition module 103 may include an image acquisition unit 131 and an audio acquisition unit 132, and the output module 104 may include an image display unit 141 and an audio output unit 142.

In the embodiment of the present disclosure, the image acquisition unit 131 may be a camera, such as a common camera or a depth camera. As shown in FIG. 2, the cameras are set on the two sides of the lens of the AR glasses. For example, one camera may be set on each side of the two lenses respectively.

The audio acquisition unit 132 may be a microphone. As shown in FIG. 2, the microphone may be arranged above a nose pad between the two lenses. The audio acquisition unit 132 may be a single microphone and may also be a microphone array.

The lens of the AR glasses is the image display unit 141 mentioned above. The image display unit 141 may be a display device with a prism structure, a holographic optical waveguide display device, a projection screen, or a geometric optical waveguide display device.

The audio output unit 142 may be an element such as an earphone and a speaker. As shown in FIG. 2, the earphone and the speaker may be arranged on two brackets of the AR glasses respectively so as to be arranged close to the user's ears, thereby enhancing the audio output effect.

Further, the augmented reality apparatus is provided with the serial number or two-dimensional code of the augmented reality apparatus for the user to use when the user sends the unlocking request to the server through the mobile terminal.

For example, the augmented reality apparatus is arranged at a public place such as a shopping mall. Xiao Ming uses his/her mobile phone to scan the two-dimensional code of the augmented reality apparatus to trigger unlocking, and returns the augmented reality apparatus after using it for a period of time. After returning, Xiao Bai uses his/her mobile phone to scan the two-dimensional code to trigger unlocking of the device, and returns the device after using it for a period of time. Sharing the usage of the augmented reality apparatus is achieved through the above manner.

In the embodiment of the present disclosure, the communication module 101 may be a wireless communication module, such as a Bluetooth communication module, a Wireless Fidelity (WIFI) communication module, an ultra-short wave communication module, a 3G communication module, a 4G communication module, a 5G communication module, or other types of communication modules which may communicate with the server.

In the embodiment of the present disclosure, the processing module 102 may be various processors or processing chips.

In the embodiment of the present disclosure, the augmented reality apparatus may further include: a global positioning system (GPS) module 105, a direction sensor 106, and a time acquisition module 107.

In the embodiment of the present disclosure, the global positioning system module 105 is configured to acquire real-time location information of the augmented reality apparatus. The direction sensor 106 is configured to acquire real-time orientation information of the augmented reality apparatus. The time acquisition module 107 is configured to acquire time information. The communication module 101 is further configured to: send a real-time scene superimposition information acquisition request to the server, wherein the real-time scene superposition information acquisition request includes at least one piece of the real-time location information, the real-time orientation information, and the time information; and receive the real-time scene superposition information sent by the server according to the real-time scene superposition information acquisition request. The real-time scene superposition information is some pieces of introduction information of the real-time scene, such as introduction information or navigation information of a certain building or store. The acquisition of the real-time scene superimposition information needs matching with the server according to current user's real-time location, orientation, time, or a combination. In order to guarantee an optimum matching result, the real-time scene superimposition information acquisition request may include real-time location information, orientation information, and time information at the same time. Here, the location may be coordinates or the longitude and latitude and the orientation may be the facing direction.

The real-time scene superimposition information sent by the server matches information such as the location, orientation, and time. As such, the pushed real-time scene superimposition information will better conform to the situation of the real-time scene. Here, the location and the orientation enable the acquired real-time scene superimposition information to be aligned with the real-time scene. The time may include dates, minutes and seconds, and the scenery introduction of the same location is different in different seasons (dates) and different time periods. For example, the introduction of the same street is different in spring and winter as well as in the morning and evening, so that it needs to carry the time in the real-time scene superimposition information acquisition request.

In the embodiment of the present disclosure, the direction sensor 106 may be a gyroscope or other components that may detect the orientation.

In the embodiment of the present disclosure, the processing module 102 is further configured to: acquire a user instruction; modify the real-time scene superimposition information according to the user's instruction, send the modified real-time scene superimposition information to the server; and update the real-time scene superimposition information in the server. When the real-time scene superimposition information does not conform to the real-time scene, the user may modify the real-time scene superimposition information through the instruction, and send the modified real-time scene superimposition information to the server for updating, so as to guarantee that the real-time scene superimposition information acquired by other subsequent users conforms to the scene. This solves the following problem in unidirectional pushing of the real-time scene superimposition information at present (pushing from the server to the augmented reality device): errors of the real-time scene superimposition information cannot be corrected in time, and may possibly be corrected only after the server updates a database.

When updating the real-time scene superimposition information in the server, in addition to sending the real-time scene superimposition information to the server through the communication module 101, the processing module 102 also needs to carry the real-time location information, the real-time orientation information, and the time information so as to guarantee the server being updated correctly. That is, the communication module 101 sends the real-time scene superimposition information and the corresponding real-time location information, real-time orientation information, and time information to the server.

In a usage process, the processing module 102 may actively ask the user whether the real-time scene superimposition information matches the real-time scene information; if yes, usage continues; and if no, the processing module prompts the user to modify the real-time scene superimposition information and the modification process is same as above. For example, the processing module 102 may output a matching prompt through a display module. For example, the matching prompt includes two options— matching and unmatching. Subsequent processing is performed according to an instruction input by the user through the matching prompt: if the input instruction is the matching indication, the usage continues; if the input instruction is the unmatching indication, the real-time scene superimposition information is modified.

In the embodiment of the present disclosure, the communication module 101 is further configured to send the real-time scene information (acquired by the acquisition module 103 above) to the server when the server cannot provide the real-time scene superimposition information.

Further, the communication module 101 is further configured to receive a real-time scene superimposition information update request sent by the server. The processing module 102 is further configured to acquire information input by the user according to the real-time scene superimposition information update request, and generate real-time scene superimposition information according to the information input by the user. The communication module 101 is further configured to send the generated real-time scene superimposition information to the server.

If there is no real-time scene superimposition information of a current scene in the server, the real-time scene information is sent to the server firstly, so that the server determines, according to the received real-time scene information, the required real-time scene superimposition information corresponding to the real-time scene. The process of determining the required real-time scene superimposition information corresponding to the real-time scene by the server may be automatically completed through the server and may also be completed by a worker through the server. For example, a real-time scene superimposition information template is pre-set and the server matches a corresponding template by extracting features from the real-time scene information. For another example, the corresponding template is selected by the worker according to the real-time scene information and then the corresponding real-time scene superimposition information is input by the user for updating. On the one hand, this manner of updating the real-time scene superimposition information may avoid a real-time scene superimposition information database in the server not being updated in time and the superimposition information of some scenes being lost, and enrich the real-time scene superimposition information significantly. The augmented reality apparatus plays an important role in the field of tourism, especially for some unfrequented locations. It may provide relatively detailed navigation and instruction information of the locations where travellers are located and thus prevent the travellers from getting lost. On the other hand, if the database is updated and maintained only depending on a superimposition information provider, the workload is relatively heavier and the cost is relatively higher. The update manner in the present disclosure may reduce the pressure and cost of the superimposition information provider.

In the embodiment of the present disclosure, the real-time scene superimposition information update request may carry an interface of the real-time scene superimposition information. An input box or a recording button for input by the user is arranged in the inteface, thereby acquiring the user's input to generate the real-time scene superimposition information according to the user input.

Further, the processing module 102 is further configured to: determine a current location before the real-time scene information is sent; compare the current location with a corresponding location where the real-time scene information is sent last time; control the communication module 101 to send the real-time scene information if the distance between the current location and the corresponding location where the real-time scene information is sent last time exceeds a set value; and not send the real-time scene information if the distance between the current location and the corresponding location where the real-time scene information is sent last time does not exceed the set value.

In the embodiment of the present disclosure, the set value may be set according to the detection accuracy of the GPS module 105. As such, the situation that the same GPS location corresponds to different real-time scene pictures when the real-time scene information is uploaded is avoided. Exemplarily, the set value is 3-5 meters usually.

Further, the augmented reality apparatus may further include a storage module configured to store the corresponding location where the real-time scene information is sent last time such that the processing module 102 may the distance between the current location and the corresponding location where the real-time scene information is sent last time exceeds the preset value.

In the embodiment of the present disclosure, when modifying or creating the real-time scene superimposition information, the user may not only implement input to the augmented reality apparatus through an input module, such as the audio acquisition unit, of the augmented reality apparatus, but also implement input through a mobile terminal connected to the augmented reality apparatus.

In the embodiment of the present disclosure, the communication module 101 is further configured to receive a locking instruction sent by the server. The processing module 102 is further configured to perform system locking on the augmented reality apparatus if the locking instruction is received. The usage of the augmented reality apparatus is ended through locking the server.

During implementation, the user may send a locking request to the server through the mobile terminal firstly, or send the locking request to the server through a key operation on the body of the augmented reality apparatus. The augmented reality apparatus further includes a locking key. When the locking key generates a signal, the communication module 101 is configured to send the locking request to the server.

Further, the communication module 101 is further configured to receive a status request sent by the server before receiving the locking instruction, and send status information of the augmented reality apparatus to the server. This may guarantee that the augmented reality apparatus is locked in a normal status and avoid the augmented reality apparatus being returned in a damaged status. In the embodiment of the present disclosure, the status information of the augmented reality apparatus may be generated by the processing module according to operating statuses of other modules. For example, sensors (such as voltage sensors) are correspondingly arranged in the image display unit and the image acquisition unit of the augmented reality apparatus for monitoring the operating statues. The processing module determines the corresponding operating status according to the data detected by each sensor. When the status information indicates that the augmented reality apparatus is damaged, the server cannot pass the verification of the locking request and does not direly send the locking instruction. The server may continuously perform the locking process through the manner of charging the user the compensation and the like. For example, when the status information indicates that the augmented reality apparatus is damaged, the server generates a payment order according to the damage condition and sends it to the mobile terminal. After the user completes payment, the server sends the locking instruction to the augmented reality apparatus.

In the embodiment of the present disclosure, the real-time scene superimposition information includes at least one piece of image information and voice information. The image information includes at least one piece of introduction information of an object in the real-time scene, a map and navigation information in the real-time scene. The voice information includes at least one piece of introduction information and navigation information of the object in the real-time scene. The image information is displayed through the image display unit. The voice information is played through the audio output unit. The better experience may be given to the user through these pieces of real-time scene superimposition information.

Exemplarily, the image information may include various forms of information, such as a text, a picture, and a video.

Figure 3:
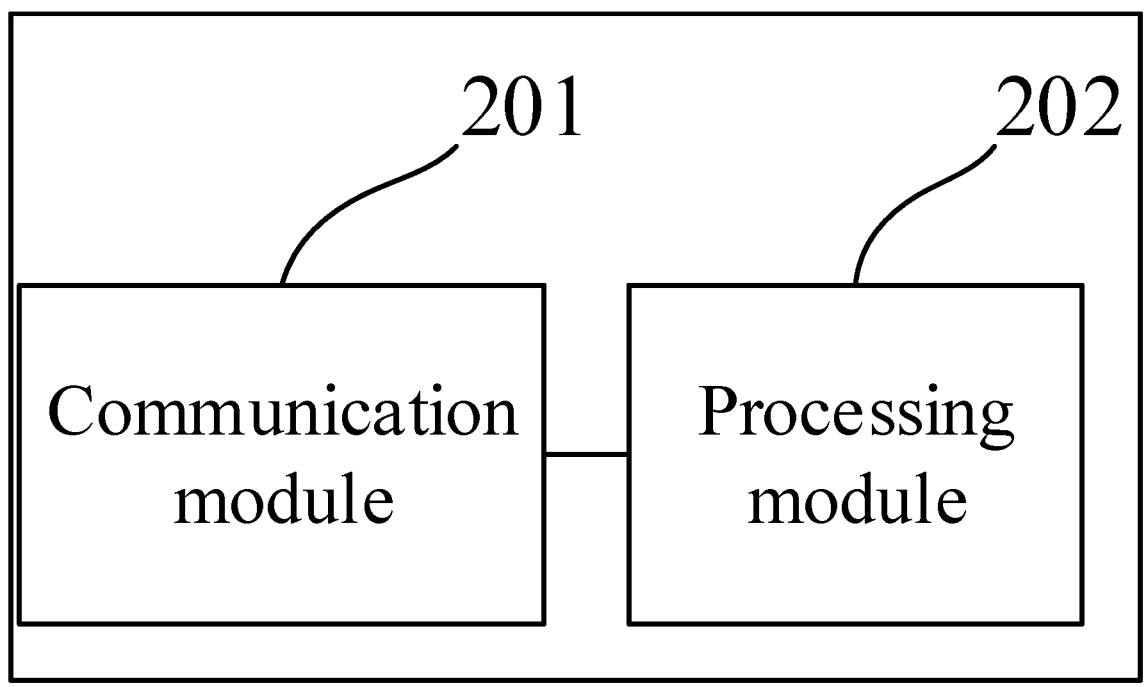
FIG. 3 is a structural diagram of a server provided in an embodiment of the present disclosure.

FIG. 3 is a structural diagram of a server provided in an embodiment of the present disclosure. Referencing to FIG. 3, the server includes a communication module 201 and a processing module 202.

In the embodiment of the present disclosure, the communication module 201 is configured to receive an unlocking request, wherein the unlocking request includes an augmented reality apparatus identifier and a user identifier. The processing module 202 is configured to verify the unlocking request. The communication module 201 is further configured to send a sharing unlocking instruction for unlocking an augmented reality apparatus corresponding to the augmented reality apparatus identifier if the unlocking request passes the verification.

In the embodiment of the present disclosure, by receiving the unlocking instruction sent by the server, the system unlocking on the augmented reality apparatus is achieved. After system unlocking, the user may use the augmented reality apparatus to integrate virtual information and the real scene. In this way, different users may use the same augmented reality apparatus. Therefore, sharing the augmented reality apparatus among multiple users is achieved, and the usage cost of the augmented reality apparatus is reduced since the user does not need to purchase the augmented reality apparatus directly.

In the embodiment of the present disclosure, the communication module 201 is further configured to receive a real-time scene superimposition information acquisition request sent by the augmented reality apparatus, wherein the real-time scene superimposition information acquisition request includes at least one piece of real-time location information, real-time orientation information, and time information of the augmented reality apparatus; and send real-time scene superimposition information to the augmented reality apparatus according to the real-time scene superimposition information acquisition request.

The real-time scene superimposition information sent by the server matches information such as the location, orientation, and time. As such, the pushed real-time scene superimposition information will better conform to the situation of the real-time scene.

Exemplarily, a database is configured in the server. The database stores the real-time scene superimposition information, and at least one piece of the real-time location information, real-time orientation information, and time information, which correspond to the real-time scene superimposition information. When the real-time scene superimposition information acquisition request sent by the augmented reality apparatus is received, the processing module 202 acquires the corresponding real-time scene superimposition information by querying the database, and then sends the real-time scene superimposition information to the augmented reality apparatus through the communication module 201.

In the embodiment of the present disclosure, the communication module 201 is further configured to receive real-time scene information sent by the augmented reality apparatus, send a real-time scene superimposition information update request to the augmented reality apparatus, and receive real-time scene superimposition information sent by the augmented apparatus device.

If there is no real-time scene superimposition information of a current scene in the server, the real-time scene information is sent to the server firstly, so that the server determines, according to the received real-time scene information, the required real-time scene superimposition information corresponding to the real-time scene, and then the corresponding real-time scene superimposition information is input by the user for updating.

In the embodiment of the present disclosure, the communication module 201 is further configured to receive the modified real-time scene superimposition information sent by the augmented reality apparatus and send it to the server. The processing module 202 is configured to update the real-time scene superimposition information in the server with the modified real-time scene superimposition information. When the real-time scene superimposition information does not conform to the real-time scene, the user may modify the real-time scene superimposition information through the instruction, and send the modified real-time scene superimposition information to the server for updating, so as to guarantee that the real-time scene superimposition information acquired by other subsequent users conforms to the scene.

In the embodiment of the present disclosure, in addition to receiving the modified real-time scene superimposition information, the communication module 201 also receives the corresponding real-time location information, real-time orientation information, and time information at the same time so as to guarantee the server being updated correctly.

In the embodiment of the present disclosure, the processing module 202 is further configured to record a user identifier and a corresponding user reward, and increase the user reward for the user identifier corresponding to the augmented reality apparatus after the real-time scene superimposition information sent by the augmented reality apparatus passes the verification and is stored. By giving the reward (which may be a point, a bonus, a reputation value and the like) to the user who uploads the correct real-time scene superimposition information and shares augmented reality apparatus, the usage cost of the augmented reality apparatus may be offset. Through the reward system, the user's enthusiasm for uploading updated information may be raised, the completeness, accuracy, and timeliness of data in the database of the server are effectively improved, and the database maintenance cost is also reduced.

In the embodiment of the present disclosure, the communication module 201 is further configured to receive a locking request, wherein the locking request includes an augmented reality apparatus identifier and the user identifier. The processing module 202 is further configured to verify the locking request. The communication module 201 is further configured to send a locking instruction for locking an augmented reality apparatus corresponding to the augmented reality apparatus identifier after the locking request passes the verification. The usage of the augmented reality apparatus is ended through locking by the server.

In the embodiment of the present disclosure, the processing module 202 verifies the locking request through the following manners: sending a status request to the augmented reality apparatus through the communication module 201; receiving status information sent by the augmented reality apparatus; and when the status information indicates that the augmented reality apparatus is damaged, the server cannot passes the verification of the locking request and does not direly send the locking instruction. The server may continue the locking process through the manner of charging the user the compensation and the like. For example, when the status information indicates that the augmented reality apparatus is damaged, the processing module 202 generates a payment order according to the damage condition, sends it to a mobile terminal through the communication module 201, and then sends the locking instruction to the augmented reality apparatus through the communication module 201 after the user completes the payment.

Figure 4:
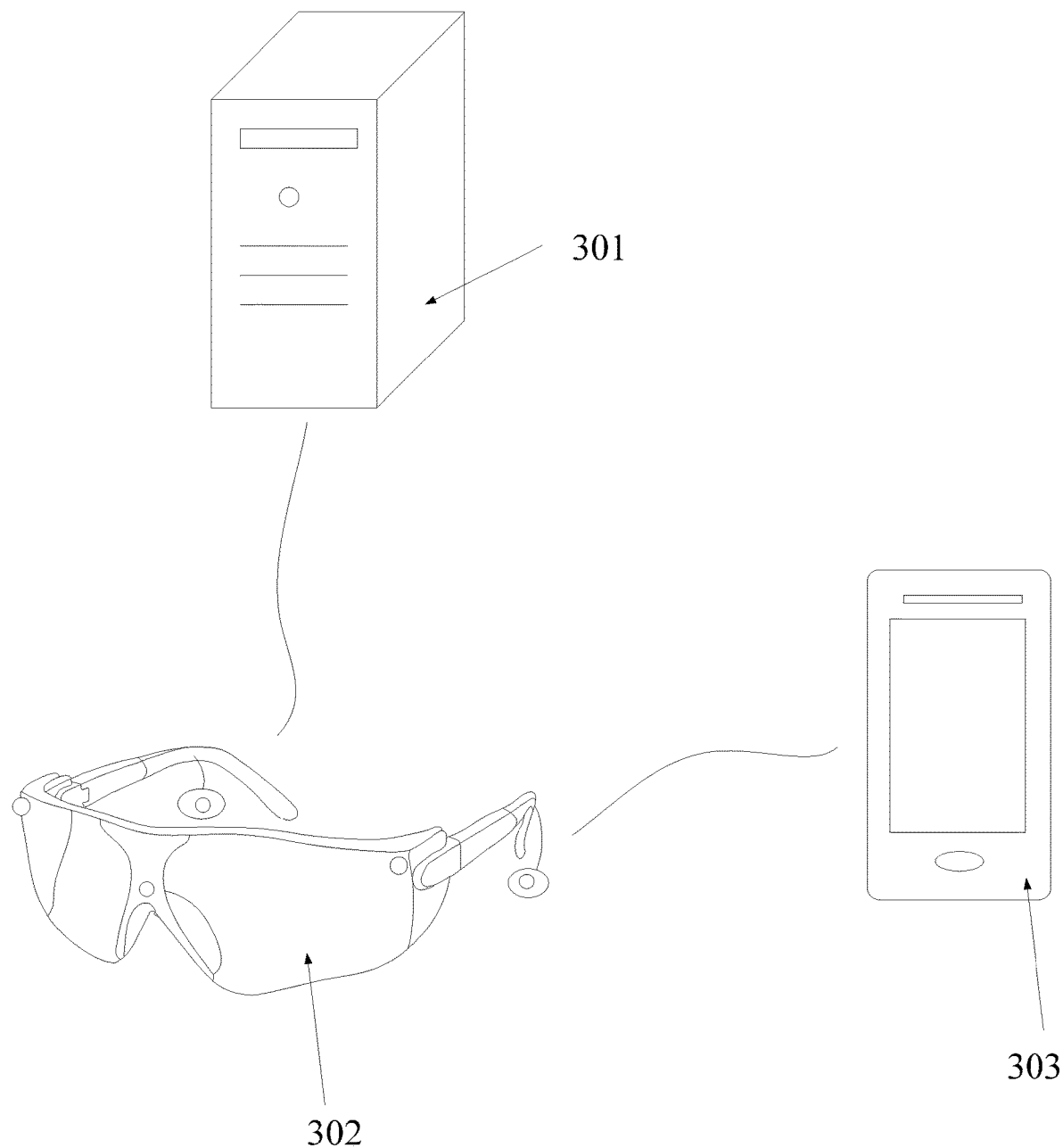
FIG. 4 is a structural diagram of an augmented reality system provided in an embodiment of the present disclosure.

FIG. 4 is a structural diagram of an augmented reality system provided in an embodiment of the present disclosure. With reference to FIG. 4, the augmented reality system includes a server 301 and an augmented reality apparatus 302. The augmented reality apparatus 302 is the augmented reality apparatus as shown in FIG. 1 and the server 301 is the server as shown in FIG. 3.

In the embodiment of the present disclosure, by receiving the unlocking instruction sent by the server, the system unlocking of the augmented reality apparatus is achieved. After system unlocking, the user may use the augmented reality apparatus to integrate the virtual reality information and the real scene. In this way, different users may use a same augmented reality apparatus. Therefore, sharing the augmented reality apparatus among multiple users is achieved, and the usage cost of the augmented reality apparatus is reduced since the user does not need to purchase the augmented reality apparatus directly.

In the embodiment of the present disclosure, the augmented reality system may further include a mobile terminal 303. The mobile terminal 303 is configured to send an unlocking request or a locking request to the server 301. An unlocking or locking is operated conveniently and easily through the mobile terminal.

In the embodiment of the present disclosure, the user may achieve that the mobile terminal sends the unlocking request to the server by inputting the serial number of the augmented reality apparatus into the mobile terminal or scanning the two-dimensional code on the augmented reality apparatus through the mobile terminal. Exemplarily, a corresponding software program may be installed in the mobile terminal. The mobile terminal scans code or inputs serial number through the software program so as to send the unlocking request to the server. After using the augmented reality apparatus, the user sends the corresponding locking request to the server through the software program.

In the embodiment of the present disclosure, the mobile terminal may be a smart phone, a tablet computer, or other devices having functions such as code scanning.

In one implementation mode of the embodiment of the present disclosure, the augmented reality apparatus is provided with a system lock. Unlocking or locking the augmented reality apparatus is achieved through one of a sharing unlocking instruction and a locking instruction, so that the user may start or end the usage of the augmented reality apparatus.

In another implementation mode of the embodiment of the present disclosure, the augmented reality system may further include an augmented reality apparatus protection box. When not used, the augmented reality apparatus is stored in the augmented reality apparatus protection box. The augmented reality apparatus protection box also has the capability to communicate with the server. In addition, the augmented reality apparatus protection box also has an electronic lock, being unlocked and locked through an instruction. When it is unlocked, the user may take out the augmented reality apparatus in the augmented reality apparatus protection box to use. The server is configured to send one of the sharing unlocking instruction and a locking instruction to the augmented reality apparatus protection box. Unlocking and locking the augmented reality apparatus are achieved by unlocking or locking the augmented reality apparatus protection box. The augmented reality apparatus protection box may, on the one hand, restrict the use right of the augmented reality apparatus and, on the other hand, protect the physical safety of the augmented reality apparatus.

Figure 5:
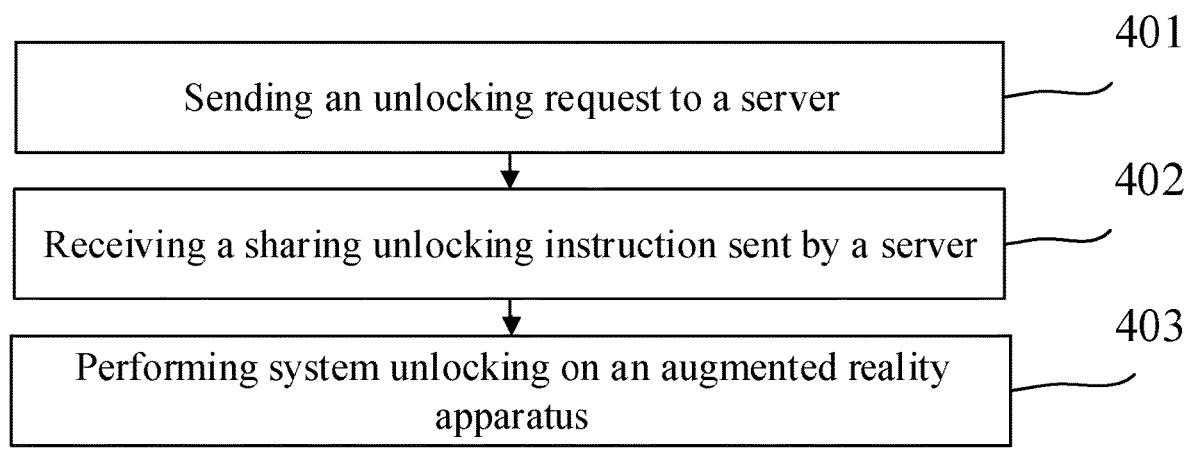
FIG. 5 is a flow chart of an augmented reality apparatus sharing method provided in an embodiment of the present disclosure.

FIG. 5 is a flow chart of an augmented reality device sharing method provided in an embodiment of the present disclosure. With reference to FIG. 5, the augmented reality apparatus sharing method includes the following steps.

In step 401, an unlocking request is sent to a server, wherein the unlocking request includes an augmented reality device identifier and a user identifier.

In step 402, a sharing unlocking instruction sent by a server is received, wherein the sharing unlocking instruction is sent by the server when the unlocking request passes the verification.

In step 403, system unlocking is performed on an augmented reality apparatus.

When the sharing unlocking instruction is received in step 402, system unlocking can performed on an augmented reality apparatus.

In the embodiment of the present disclosure, the method shown from step 401 to step 403 is implemented by the above augmented reality apparatus. In addition to the above steps executed by the augmented reality device, the method may further include: acquiring real-time scene superimposition information corresponding to a real-time scene from the server after the augmented reality apparatus is subjected to system unlocking.

The method may further include: outputting real-time scene superimposition information. In the embodiment of the present disclosure, the step of outputting real-time scene superimposition information includes the following two implementation modes.

In the first implementation mode, after the augmented reality apparatus is subjected to system unlocking, real-time scene information is acquired; the real-time scene superimposition information is synthesized onto the real-time scene information; and the synthesized real-time scene information is output. In this implementation mode, the augmented reality apparatus synthesizes the real-time scene superimposition information and the real-time scene information and then displays it.

In the second implementation mode, the real-time scene superimposition information is output. In this implementation mode, when wearing the augmented reality apparatus, the user may view the real-time scene. At this time, it only needs to display the real-time scene superimposition information and lets the user himself synthesize them.

In the embodiment of the present disclosure, acquiring real-time scene superimposition information corresponding to a real-time scene from the server may include: acquiring real-time location information of the augmented reality apparatus; acquiring real-time orientation information of the augmented reality apparatus; acquiring time information; sending a real-time scene superimposition information acquisition request to the server, wherein the real-time scene superimposition information acquisition request includes at least one piece of the real-time location information, the real-time orientation information, and the time information; and receiving the real-time scene superimposition information sent by the server according to the real-time scene superimposition information acquisition request.

Optionally, the method may further include: acquiring a user instruction, modifying the real-time scene superimposition information according to the user instruction, sending the modified real-time scene superimposition information to the server; and updating the real-time scene superimposition information in the server.

Optionally, the method may further include: sending the real-time scene information to the server when the server cannot provide the real-time scene superimposition information; receiving a real-time scene superimposition information update request sent by the server; acquiring information input by the user according to the real-time scene superimposition information update request, and generating real-time scene superimposition information according to the information input by the user; and sending the generated real-time scene superimposition information to the server.

Optionally, the method may further include: sending a locking request to the server, wherein the locking request comprises an augmented reality device identifier and a user identifier; receiving a locking instruction, wherein the locking instruction is sent by the server when the locking request passes the verification; and performing system locking on the augmented reality apparatus.

In the embodiment of the present disclosure, by receiving the unlocking instruction sent by the server, the system unlocking of the augmented reality apparatus is achieved. After the system unlocking, the user may use the augmented reality apparatus to integrate the virtual reality information and the real scene. In this way, different users may use the same augmented reality apparatus. Therefore, sharing the augmented reality apparatus among multiple users is achieved, and the usage cost of the augmented reality apparatus is reduced since the user does not need to purchase the augmented reality apparatus directly.

Figure 6:
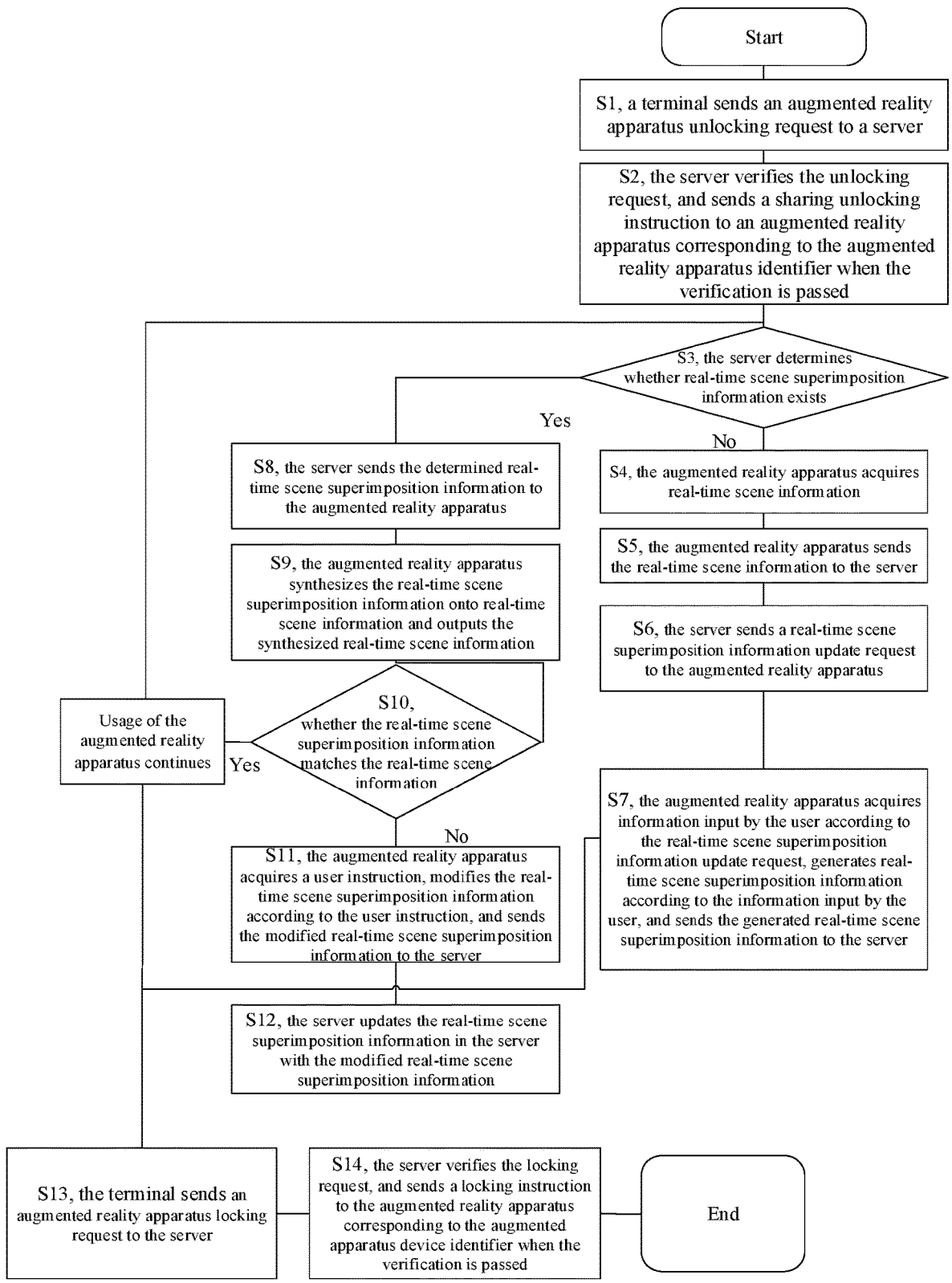
FIG. 6 is a working diagram of the augmented reality system provided in the embodiment of the present disclosure.

FIG. 6 is a working diagram of the augmented reality system provided in the embodiment of the present disclosure. The usage process of the augmented reality apparatus is illustrated with reference to FIG. 6 below.

In step S1, a user sends an augmented reality apparatus unlocking request to a server through a mobile terminal and accordingly, the server receives the unlocking request sent by the mobile terminal, wherein the unlocking request carries a user identifier and an augmented reality apparatus identifier.

The unlocking request may be sent after the mobile terminal scans a serial number or a two-dimensional code on the augmented reality apparatus.

In step S2, the server verifies the unlocking request, and sends a sharing unlocking instruction to an augmented reality apparatus corresponding to the augmented reality apparatus identifier if the verification is passed; and the augmented reality apparatus corresponding to the augmented reality device identifier receives the sharing unlocking instruction and completes system unlocking.

When there is an augmented reality apparatus protection box, the augmented reality apparatus protection box also needs to be unlocked and there are two following implementation modes.

In one implementation mode, the augmented reality apparatus protection box is associated with the augmented reality apparatus stored in the augmented reality apparatus protection box, and the user only needs to send the augmented reality apparatus unlocking request through the mobile terminal once. After receiving the request, the server sends the sharing unlocking instruction to the augmented reality apparatus protection box and the augmented reality apparatus at the same time. The sharing unlocking instruction unlocks the augmented reality apparatus protection box and the augmented reality apparatus at the same time and subsequent locking instructions are the same.

In another implementation mode, the augmented reality apparatus protection box is not associated with the augmented reality apparatus stored in the augmented reality device protection box. The user sends the augmented reality device unlocking request through the mobile terminal once for unlocking the augmented reality apparatus protection box, and then sends the augmented reality apparatus unlocking request again for unlocking the augmented reality apparatus after the augmented reality device protection box is unlocked. The two unlocking processes are the same as steps S1 and S2.

In step S3, the augmented reality apparatus sends a real-time scene superimposition information acquisition request to the server; and the server receives the real-time scene superimposition information acquisition request and determines whether real-time scene superimposition information corresponding to the real-time scene superimposition information acquisition request exists. If yes, step S8 is executed; and if no, step S4 is executed.

In step S4, the server informs the augmented reality apparatus that the real-time scene superimposition information corresponding to the real-time scene superimposition information acquisition request is not stored in the server, and the augmented reality apparatus acquires real-time scene information.

In step S5, the augmented reality apparatus sends the real-time scene information to the server; and the server receives the real-time scene information sent by the augmented reality apparatus.

In step S6, the server sends a real-time scene superimposition information update request to the augmented reality apparatus; and the augmented reality apparatus receives the real-time scene superimposition information update request sent by the server.

The request may carry an interface of the real-time scene superimposition information. An input box or a recording button for input by the user is arranged in the interface, thereby obtaining the user's input.

In step S7, the augmented reality apparatus acquires information input by the user according to the real-time scene superimposition information update request, generates real-time scene superimposition information according to the information input by the user, sends the generated real-time scene superimposition information to the server; and the server receives the real-time scene superimposition information sent by the augmented reality apparatus.

In step S8, the server sends the determined real-time scene superimposition information to the augmented reality apparatus; and the augmented reality apparatus receives the determined real-time scene superimposition information sent by the server.

In step S9, the augmented reality apparatus synthesizes the real-time scene superimposition information onto real-time scene information and outputs the synthesized real-time scene information.

In another implementation mode, step S9 may also adopt the manner of directly outputting the real-time scene superimposition information.

In step S10, in a usage process, the augmented reality apparatus may actively ask the user whether the real-time scene superimposition information matches the real-time scene information; if yes, usage continues; and if no, step S11 is executed.

In step S11, the augmented reality apparatus acquires a user instruction, modifies the real-time scene superimposition information according to the user instruction, and sends the modified real-time scene superimposition information to the server; and the server receives modified the real-time scene superimposition information.

S11 may also be initiated actively by the mobile terminal without being queried by the augmented reality apparatus.

In step S12, the server updates the real-time scene superimposition information in the server with the modified real-time scene superimposition information.

Optionally, the method may further include: recording the user identifier and a corresponding user reward, and increasing the user reward for the user identifier that the augmented reality apparatus corresponds to after the real-time scene superimposition information sent by the augmented reality apparatus passes the verification and is stored.

In step S13, the user sends an augmented reality apparatus locking request to the server through the mobile terminal and accordingly, the server receives the locking request sent by the mobile terminal, wherein the above locking request carries the user identifier and the augmented reality apparatus identifier.

In addition to being implemented through the mobile terminal, the locking request may also be implemented through a key operation on the body of the augmented reality apparatus.

In step S14, the server verifies the locking request, and sends a locking instruction to the augmented reality apparatus corresponding to the augmented apparatus device identifier if the verification is passed; and the augmented reality apparatus corresponding to the augmented reality apparatus identifier receives the locking instruction and completes system locking.

Figure 7:
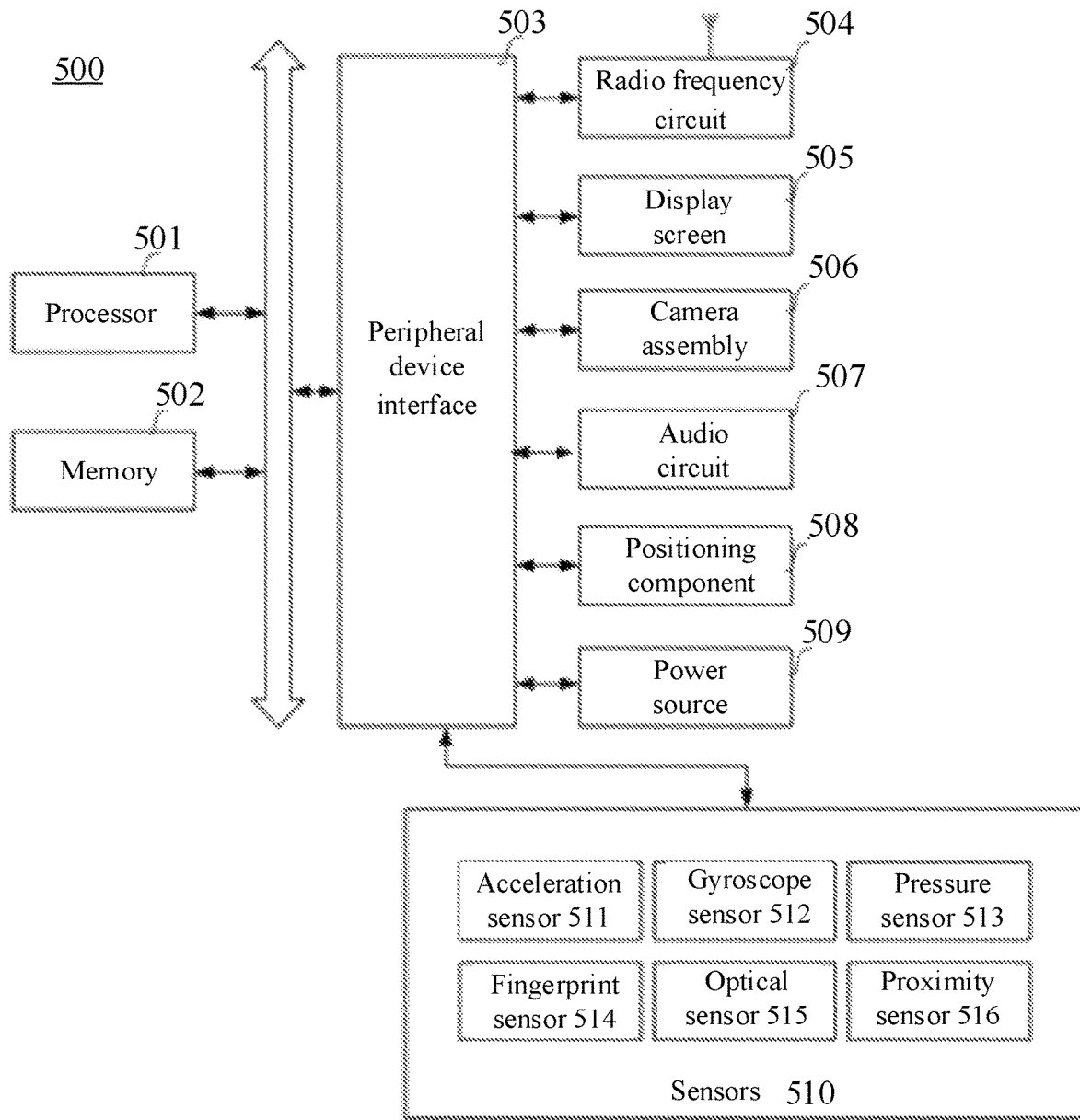
FIG. 7 is a structural block diagram of the augmented reality apparatus provided in the embodiment of the present disclosure.

FIG. 7 is a structural block diagram of an augmented reality apparatus 500 provided in an embodiment of the present disclosure. Usually, the device 500 includes a processor 501 and a memory 502.

The processor 501 may include one or multiple processing cores. For example, the processor is a 4-core processor or an 8-core processor. The processor 501 may be implemented in at least one hardware form of a digital signal processor (DSP), a field-programmable gate array (FPGA), and a programmable logic array (PLA). The processor 501 may also include a main processor and a coprocessor. The main processor is a processor which processes data in an awake state and is also called central processing unit (CPU). The coprocessor is a low-power-consumption processor which processes data in a standby state. In some embodiments, the processor 501 may be integrated with a graphics processing unit (GPU) responsible for rendering and drawing the content required to be displayed on a display screen. In some embodiments, the processor 501 may further include an artificial intelligence (AI) processor for processing a calculation operation related to machine learning.

The memory 502 may include one or multiple computer-readable storage media which may be non-transient. The memory 502 may further include a high-speed random-access memory and a non-volatile memory, such as one or multiple disk storage devices and flash memory devices. In some embodiments, the non-transient computer-readable storage medium in the memory 502 is used to store at least one instruction. The at least one instruction is used to be executed by processor 501 so as to implement the augmented reality multiple sharing method provided in the method embodiment of the present disclosure.

In some embodiments, the device 500 may further optionally include a peripheral device interface 503 and at least one peripheral device. The processor 501, the memory 502, and the peripheral device interface 503 may be connected through a bus or a signal line. Each peripheral device may be connected to the peripheral device interface 503 through a bus, a signal line, or a circuit board. Specifically, the peripheral device includes at least one of a radio frequency circuit 504, a display screen 505, a camera assembly 506, an audio circuit 507, a positioning component 508, and a power source 509.

The peripheral device interface 503 may be used to connect at least one peripheral device, which is related to input/output (I/O), to the processor 501 and the memory 502. In some embodiments, the processor 501, the memory 502, and the peripheral device interface 503 are integrated on the same chip or circuit board. In some other embodiments, any one or two of the processor 501, the memory 502, and the peripheral device interface 503 may be implemented on a single chip or circuit board, which is not limited in the embodiment of the present disclosure.

The radio frequency circuit 504 is used to receive and transmit a radio frequency (RF) signal which is also called electromagnetic signal. The radio frequency circuit 504 communicates with a communication network and other communication devices through the electromagnetic signal. The radio frequency circuit 504 converts an electrical signal to the electromagnetic signal for sending or converts the received electromagnetic signal to the electrical signal. Optionally, the radio frequency circuit 504 includes: an antenna system, an RF transceiver, one or multiple amplifiers, a tuner, an oscillator, a digital signal processor, an encoding and decoding chipset, a subscriber identity module card, and the like. The radio frequency circuit 504 may communicate with other terminals through at least one wireless communication protocol. The wireless communication protocol includes, but is not limited to: a metropolitan area network, each generation mobile communication network (2G, 3G, 4G and 5G), a wireless local area network and/or a WiFi (Wireless Fidelity) network. In some other embodiments, the radio frequency circuit 504 may also include a circuit related to near field communication (NFC), which is not limited in the present disclosure.

The display screen 505 is used to display a user interface (UI). The UI may include a graph, a text, an icon, a video, and any combination thereof. When the display screen 505 is a touch display screen, the display screen 505 also has the capability to collect a touch signal on or above the surface of the display screen 505. The touch signal may be, as a control signal, input to the processor 501 for processing. At this time, the display screen 505 may also be used to provide a virtual button and/or a virtual keyboard also called soft button and/or soft keyboard. In some embodiments, there may be one display screen 505 arranged on a front panel of the device 500. In some other embodiments, there may be at least two display screens 505 arranged on different surfaces of the device 500 respectively or arranged in a folding manner. In some other embodiments, the display screen 505 may be a flexible display screen arranged on a curved surface or a folded surface of the device 500. Even, the display screen 505 may also be arranged to be of a non-rectangular irregular shape, that is, an irregularly shaped screen. The display screen 505 may be prepared with a liquid crystal display (LCD), an organic light-emitting diode (OLED), and other materials.

The camera assembly 506 is used to collect an image or a video. Optionally, the camera assembly 506 includes a front-facing camera and a rear-facing camera. Usually, the front-facing camera is arranged on a front panel of the terminal, and the rear-facing camera is arranged on the back of the terminal. In some embodiments, there are at least two rear-facing cameras, each of which is a main camera, a depth-of-field camera, a wide-angle camera, or a camera with a long-focus lens, wherein the main camera and the depth-of-field camera fuse to achieve the function of background blurring, and the main camera and the wide-angle camera fuse to achieve the functions of panorama shooting and virtual reality (VR) shooting or other fusion shooting functions. In some embodiment, the camera assembly 506 may further include a flash. The flash may be a single-color-temperature flash or may also be a dual-color-temperature flash. The dual-color-temperature flash is a combination of a warm-light flash and a cold-light flash and may be used for light compensation under different color temperatures.

The audio circuit 507 may include a microphone and a speaker. The microphone is used to collect sound waves of the user and the environment, and convert the sound waves to electrical signal for inputting to the processor 501 for processing, or inputting to the radio frequency circuit 504 to achieve voice communication. For the purpose of stereophonic sound collection or noise reduction, there may be a plurality of microphones arranged at different parts of the device 500 respectively. The microphone may also be a microphone array or an omni-directional microphone. The speaker is used to convert the electrical signal from the processor 501 or the radio frequency circuit 504 to sound waves. The speaker may be a traditional thin-film speaker or may also be a piezoelectric ceramic speaker. When being the piezoelectric ceramic speaker, the speaker may not only convert the electrical signal to human audible sound waves, but also convert the electrical signal to human-inaudible sound waves for measuring distance and the like. In some embodiments, the audio circuit 507 may also include a headphone jack.

The positioning component 508 is used to position a current geographical location of the device 500 so as to implement navigation or a location-based service (LBS). The positioning component 508 may be a positioning component based on an America's global positioning system (GPS), a China's Beidou system, a Russia's Glonass system, or a European Union's Galileo system.

The power source 509 is used to supply power for various components in the device 500. The power source 509 may be an alternating current, a direct current, a disposable battery, or a rechargeable battery. When the power source 509 includes the rechargeable battery, the rechargeable battery may support wired or wireless charging. The rechargeable battery may also be used to support a fast charging technology.

In some embodiments, the device 500 may also include one or multiple sensors 510. The one or alternating current sensors 510 include but not limited to: an acceleration sensor 511, a gyroscope sensor 512, a pressure sensor 513, a fingerprint sensor 514, an optical sensor 515, and a proximity sensor 516.

It may be understood by a person skilled in the art that the structures shown in FIG. 7 do not constitute the limitation for the device 500 and the device may include more or fewer components than those shown, or combine certain components, or use different component layouts.

Figure 8:
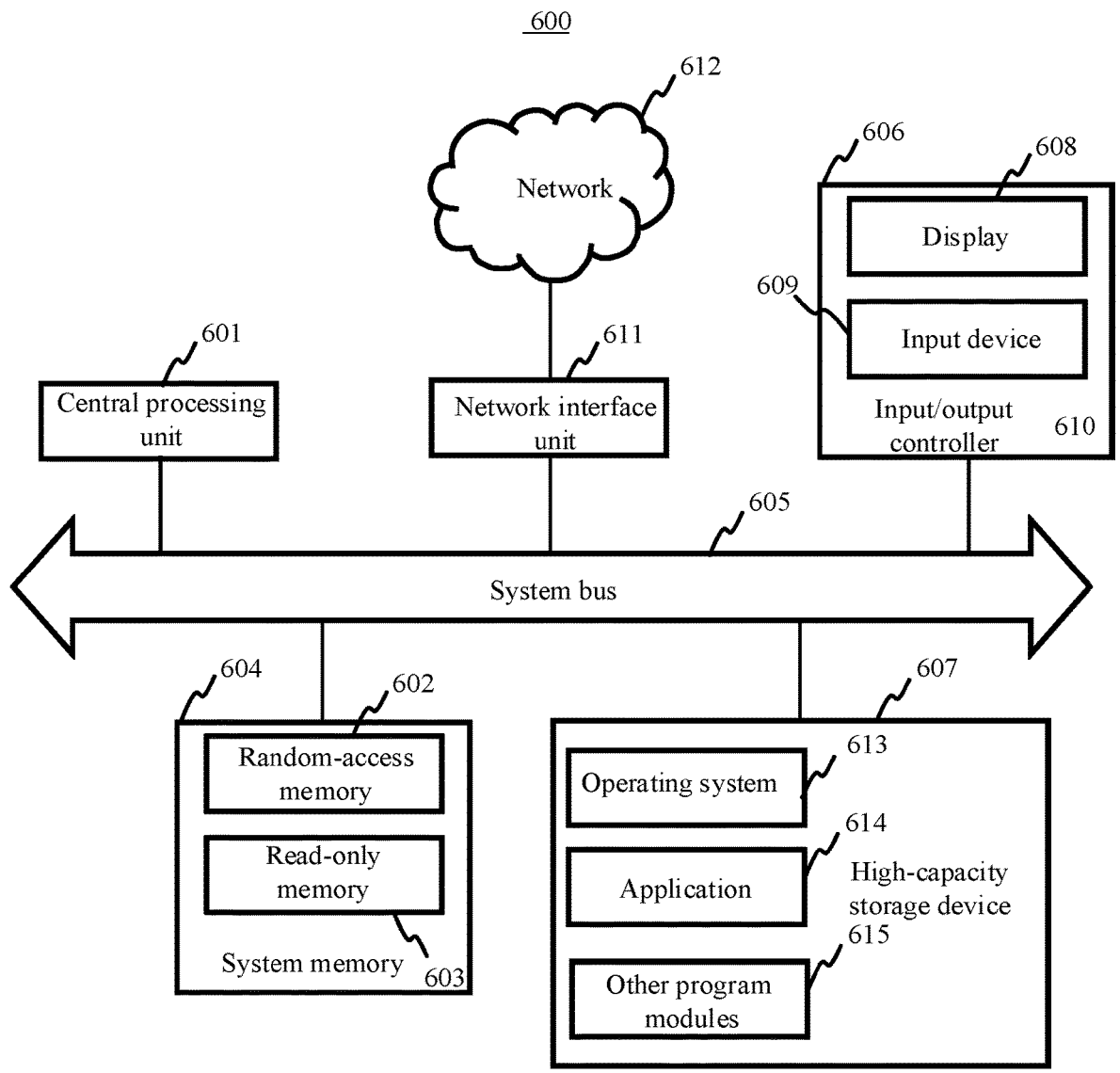
FIG. 8 is a structural block diagram of the server provided in the embodiment of the present disclosure.

FIG. 8 is a structural block diagram of the server provided in the embodiment of the present disclosure. The server 600 includes a central processing unit (CPU) 601, a system memory 604 including a random-access memory (RAM) 602 and a read-only memory (ROM) 603, and a system bus 605 connecting the system memory 604 and the central processing unit 601. The server 600 further includes a basic input/output system (I/O system) 606 which helps information transmission between various components within a computer, and a high-capacity storage device 607 for storing an operating system 613, an application 614 and other program modules 615.

The basic input/output system 606 includes a display 608 for displaying information and an input device 609, such as a mouse and a keyboard, for inputting information by the user. Both the display 608 and the input device 609 are connected to the central processing unit 601 through an input/output controller 610 connected to the system bus 605. The basic input/output system 606 may also include the input/output controller 610 for receiving and processing input from the keyboard, the mouse, an electronic stylus or a plurality of other devices. Similarly, the input/output controller 610 further provides output to the display screen, a printer, or other types of output devices.

The high-capacity storage device 607 is connected to the central processing unit 601 through a high-capacity storage controller (not shown) connected to the system bus 605. The high-capacity storage device 607 and a computer-readable medium associated therewith provide non-volatile storage for the server 600. That is, the high-capacity storage device 607 may include the computer-readable medium (not shown), such as a hard disk or a CD-ROM driver.

Without loss of generality, the computer-readable medium may include a computer storage medium and a communication medium. The computer storage media include volatile and non-volatile, removable and non-removable media implemented in any method or technology for storage of information such as a computer-readable instruction, a data structure, a program module or other data. The computer storage media include an RAM, an ROM, an EPROM, an EEPROM, a flash memory, or other solid-state storage technologies, a CD-ROM, a DVD or other optical storage, a tape cartridge, a magnetic tape, a disk storage or other magnetic storage devices. Of course, it will be appreciated by a person skilled in the art that the computer storage medium is not limited to the above. The above system memory 604 and the high-capacity storage device 607 may be collectively referred to memory.

According to various embodiments of the present disclosure, the server 600 may also be run through a remote computer connected to a network, such as Internet. That is, the server 600 may be connected to the network 612 through a network interface unit 611 on the system bus 605, or may be connected to other types of networks or remote computer systems (not shown) with the network interface unit 611.

The memory further includes one or multiple programs stored therein, and the central processing unit 601 implements the augmented reality apparatus sharing method shown in FIG. 5 or FIG. 6 by executing the one or multiple programs.

An exemplary embodiment further provides a non-transitory computer-readable storage medium including an instruction, such as the memory including an instruction, which is executable for the processor of the server to implement the augmented reality apparatus sharing method shown in various embodiments of the present disclosure. For example, the non-transitory computer-readable storage medium may be an ROM, a random access memory (RAM), a CD-ROM, a magnetic tape, a floppy disk, an optical data storage device and the like.

The foregoing descriptions are only exemplary embodiments of the present disclosure, and are not intended to limit the present disclosure. Within the spirit and principles of the disclosure, any modifications, equivalent substitutions, improvements, etc., are within the protection scope of the appended claims of the present disclosure.

What is claimed is:

1. A sharing method for an augmented reality apparatus, comprising:
    sending an unlocking request to a server, wherein the unlocking request comprises an augmented reality device identifier and a user identifier;
    receiving a sharing unlocking instruction, wherein the sharing unlocking instruction is sent by the server when the unlocking request passes a verification; and
    performing system unlocking on the augmented reality apparatus,
    wherein the method further comprises:
    sending a locking request to the server, wherein the locking request comprises an augmented reality device identifier and a user identifier;
    receiving a locking instruction, wherein the locking instruction is sent by the server when the locking request passes a verification; and
    performing system locking on the augmented reality apparatus.

2. An augmented reality apparatus, comprising: a processor; and a memory configured to store instructions executable by the processor; wherein the processor is configured to execute the augmented reality apparatus sharing method of claim 1.

3. A computer-readable storage medium, wherein instructions in the computer-readable storage medium, when being executed by a processor of an augmented reality apparatus, cause the augmented reality apparatus to execute the augmented reality apparatus sharing method of claim 1.

4. The method according to claim 1, further comprising:
    acquiring real-time scene superimposition information corresponding to a real-time scene from the server after the augmented reality apparatus is subjected to system unlocking, wherein the real-time scene superimposition information comprises at least one of image information and voice information, the image information comprises at least one of introduction information of an object in the real-time scene, a map, and navigation information in the real-time scene, and the voice information comprises at least one of introduction information of an object and navigation information in the real-time scene.

5. The method according to claim 4, wherein acquiring real-time scene superimposition information corresponding to a real-time scene from the server comprises:
    sending a real-time scene superimposition information acquisition request to the server, wherein the real-time scene superimposition information acquisition request comprises at least one of real-time location information, real-time orientation information and time information; and receiving the real-time scene superimposition information sent by the server according to the real-time scene superimposition information acquisition request.

6. The method according to claim 4, further comprising:
acquiring a user's instruction;
modifying the real-time scene superimposition information according to the user's instruction; and
sending the modified real-time scene superimposition information to the server.

7. The method according to claim 4, further comprising:
acquiring real-time scene information after the augmented reality apparatus is subjected to system unlocking; and
sending the real-time scene information to the server if the server cannot provide the real-time scene superimposition information.

8. The method according to claim 7, further comprising:
receiving a real-time scene superimposition information update request sent by the server;
acquiring information input by a user according to the real-time scene superimposition information update request, and generating real-time scene superimposition information according to the information input by the user, and
sending the real-time scene superimposition information to the server.

9. An augmented reality sharing method, comprising:
receiving an unlocking request, wherein the unlocking request comprises an augmented reality apparatus identifier and a user identifier;
verifying the unlocking request received; and
sending a sharing unlocking instruction for unlocking an augmented reality apparatus that the augmented reality apparatus identifier corresponds to if the unlocking request passes a verification,
wherein the method further comprises:
receiving a locking request, wherein the locking request comprises an augmented reality device identifier and a user identifier;
verifying the locking request; and
sending a locking instruction for locking an augmented reality apparatus that the augmented reality apparatus identifier corresponds to when the locking request passes a verification.

10. The method according to claim 9, further comprising:
receiving a real-time scene superimposition information acquisition request sent by the augmented reality apparatus, wherein the real-time scene superimposition information acquisition request comprises at least one of real-time location information, real-time orientation information, and time information of the augmented reality apparatus; and sending real-time scene superimposition information corresponding to the real-time scene superimposition information acquisition request to the augmented reality apparatus.

11. The method according to claim 10, further comprising:
receiving real-time scene information sent by the augmented reality apparatus;
sending a real-time scene superimposition information update request to the augmented reality apparatus; and
receiving real-time scene superimposition information sent by the augmented reality apparatus.

12. The method according to claim 11, further comprising:
recording the user identifier and a corresponding user reward, and increasing the user reward for the user identifier that the augmented reality apparatus corresponds to after the real-time scene superimposition information sent by the augmented reality apparatus passes the verification and is stored.

13. A server, comprising: a processor; and a memory configured to store instructions executable by the processor; wherein the processor is configured to execute the augmented reality apparatus sharing method of claim 9.

14. A computer-readable storage medium, wherein instructions in the computer-readable storage medium, when being executed by a processor of a server, cause the server to execute the augmented reality apparatus sharing method of claim 9.

15. An augmented reality system, comprising: a server and an augmented reality apparatus, wherein the augmented reality apparatus is configured to send an unlocking request to the server, the unlocking request comprises the augmented reality apparatus identifier and a user identifier; receive a sharing unlocking instruction, wherein the sharing unlocking instruction is sent by the server when the unlocking request passes a verification; and perform system unlocking on the augmented reality apparatus; and
the server is configured to receive the unlocking request; verify the unlocking request received; and send a sharing unlocking instruction for unlocking an augmented reality apparatus that the augmented reality apparatus identifier corresponds to if the unlocking request passes the verification,
wherein the augmented reality apparatus is further configured to send a locking request to the server, the locking request comprising an augmented reality device identifier and a user identifier; receive a locking instruction, the locking instruction being sent by the server when the locking request passes a verification; and perform system locking on the augmented reality apparatus, and
wherein the server is further configured to receive a locking request, the locking request comprising an augmented reality device identifier and a user identifier; verify the locking request; and send a locking instruction for locking an augmented reality apparatus that the augmented reality apparatus identifier corresponds to when the locking request passes a verification.

16. The augmented reality system according to claim 15, further comprising a mobile terminal, wherein
the mobile terminal is configured to send one of an unlocking request and a locking request to the server.

17. The augmented reality system according to claim 15, further comprising: an augmented reality apparatus protection box, wherein the server is configured to send one of a sharing unlocking instruction and a locking instruction to the augmented reality apparatus protection box.

18. The augmented reality system according to claim 15, wherein the augmented reality apparatus is further configured to: acquire real-time scene superimposition information corresponding to a real-time scene from the server after the augmented reality apparatus is subjected to system unlocking, wherein the real-time scene superimposition information comprises at least one of image information and voice information, the image information comprises at least one of introduction information of an object in the real-time scene, a map, and navigation information in the real-time scene, and the voice information comprises at least one of introduction information of an object and navigation information in the real-time scene.

* * * * *